(12) United States Patent
Aittamaa et al.

(10) Patent No.: US 8,815,198 B2
(45) Date of Patent: Aug. 26, 2014

(54) METHOD OF PURIFYING GAS STREAMS

(71) Applicant: Neste Oil Oyj, Espoo (FI)

(72) Inventors: Juhani Aittamaa, Helsinki (FI); Kari Keskinen, Helsinki (FI); Jukka Keyriläinen, Espoo (FI)

(73) Assignee: Neste Oil OYJ, Espoo (FI)

( * ) Notice: Subject to any disclaimer, the term of this patent is extended or adjusted under 35 U.S.C. 154(b) by 0 days.

(21) Appl. No.: 13/962,618

(22) Filed: Aug. 8, 2013

(65) Prior Publication Data

US 2014/0042367 A1    Feb. 13, 2014

Related U.S. Application Data

(60) Provisional application No. 61/680,725, filed on Aug. 8, 2012.

(30) Foreign Application Priority Data

Aug. 8, 2012  (EP) .................................. 12179672

(51) Int. Cl.
*C10L 1/16* (2006.01)
*C07C 1/00* (2006.01)
*B01D 53/48* (2006.01)

(52) U.S. Cl.
USPC .......... 423/243.07; 585/733; 44/308; 44/458; 44/605

(58) Field of Classification Search
USPC ......... 423/243.07; 585/733; 44/308, 458, 605
See application file for complete search history.

(56) References Cited

U.S. PATENT DOCUMENTS

| 4,298,584 A | 11/1981 | Makrides |
| 5,670,123 A | 9/1997 | Mileo et al. |
| 2010/0240942 A1 | 9/2010 | Daudin et al. |
| 2012/0251424 A1* | 10/2012 | Havlik et al. ................. 423/322 |

FOREIGN PATENT DOCUMENTS

| EP | 1 681 337 B1 | 12/2010 |
| FR | 1 225 628 A | 7/1960 |
| WO | WO 98/55209 A1 | 12/1998 |

OTHER PUBLICATIONS

Search Report issued on Dec. 18, 2012, by the European Patent Office for Application No. 12179672.
Written Opinion issued on Dec. 18, 2012, by the European Patent Office for Application No. 12179672.

* cited by examiner

*Primary Examiner* — Timothy Vanoy
(74) *Attorney, Agent, or Firm* — Buchanan Ingersoll & Rooney PC

(57) ABSTRACT

A method of purifying a gas stream formed from a process wherein a glyceride containing raw material is converted to hydrocarbon paraffins. The gas stream contains hydrogen or carbon dioxide as a major component and at least one sulphurous component selected from sulphide compounds as an impurity. The gas is contacted with an acidic aqueous wash solution of transition metal ions capable of binding to sulphide ions. A significant portion of the sulphide compounds contained in the gas are bound into practically insoluble transition metal sulphide compounds to remove sulphide compounds from the gas to produce a purified gas. The obtained purified gas is recovered. The method efficiently lowers sulphide concentrations to ppm or sub-ppm level and it can be implemented on an industrial scale with low investment costs. The metal can be recovered.

47 Claims, 2 Drawing Sheets

METHOD OF PURIFYING GAS STREAMS

RELATED APPLICATION(S)

This application claims priority under 35 U.S.C. §119(e) to U.S. Provisional Application No. 61/680,725 filed on Aug. 8, 2012, the entire content of which is hereby incorporated by reference in its entirety. This application also claims priority under 35 U.S.C. §119 to European Patent Application No. 12179672.6 filed in Europe on Aug. 8, 2012, the entire content of which is hereby incorporated by reference in its entirety.

FIELD

The present disclosure relates to purification of gas streams. For example, the present disclosure concerns a method of purifying a gas stream derived from a process wherein a raw material containing glycerides, fatty acids or combinations thereof is converted to hydrocarbon paraffins. Such gas streams can contain a minimum of about 75 vol.-% of hydrogen or carbon dioxide as a major component and at least one sulphurous component selected from sulphide compounds as an impurity.

BACKGROUND INFORMATION

Natural oils and fats are mainly composed of triglycerides. Triglycerides are triesters of fatty acids and glycerol. Vegetable oils and animal fats can also contain some free fatty acids (FFA), which are formed during production of oils and fats through hydrolysis of triglyceride. These raw materials (in the following also referred to as "glyceride raw material") can be used as a valuable feedstock for the production of diesel grade fuels.

Approaches for converting vegetable oils or other fatty acid derivatives into liquid fuels comprise transesterification, catalytic hydrotreatment, hydrocracking, catalytic cracking without hydrogen and thermal cracking, among others. In the hydrotreatment of vegetable oils (HVO) and animal fats, hydrogen is used to remove oxygen from the triglyceride vegetable oil molecules and to split the triglyceride into separate chains thus creating hydrocarbons. During hydrotreatment, for example, hydrodeoxygenation, oxygen containing groups are reacted with hydrogen and removed through formation of water and therefore this reaction employs rather high amounts of hydrogen. Decarboxylation and decarbonylation can occur as side reactions in hydrodeoxygenation producing carbon dioxide and carbon monoxide, respectively.

A catalytic method for the manufacture of hydrocarbons, which are suitable for diesel fuel, from renewable sources, such as plant and vegetable oils and fats and animal and fish oils and fats, is disclosed in EP 1 681 337. The process includes the step of transforming the starting materials into hydrocarbons with minimal consumption of hydrogen, by contacting the starting material with a heterogeneous catalyst comprising at least one metal selected from the metals belonging to the group VIII of the Periodic Table. The hydrocarbons formed via decarboxylation/decarbonylation reactions have one carbon atom less than the original fatty acid or fatty acid portion of its derivate.

The products obtained by the above-mentioned process have a chemical composition which corresponds to that of traditional diesel. They can be blended with fossil diesel, traditional biodiesel (FAME), or used as such in diesel engines.

During the conversion of a glyceride raw material by deoxygenation reactions, off-gases are formed which, depending on the raw material and the reaction conditions, contain various concentrations of impurities which impair processing of the raw material and potentially even the product properties of the final products. Impurities can include sulphide compounds, such as $H_2S$ and COS, ammonia, and halogenides, such as chloride compounds. The latter compounds are primarily formed during processing of the feed. For example, nitrogen compounds give ammonia, and chlorides give hydrochloric acid at the conditions employed in a hydrodeoxygenation reactor. The concentration of ammonia and chlorides are at the ppm level in gas volumes withdrawn from deoxygenation reactions.

Regarding the sulphides, there are various sources. In a hydrodeoxygenation reactor, the catalyst metals can be active in sulphided form and the presence of sulphur or sulphurous compounds during the operation of the reactor can be required for maintaining catalyst activity. For this purpose, some sulphur compounds are actively recycled from a point downstream of the process. Another source of sulphur compounds or sulphides is represented by the feed which usually contains minor amounts of sulphide compounds. However, in practice, there can still be a need for the introduction of fresh (external) sulphur compounds for process control.

As a result of the cumulative sulphur sources, the effluent gases of the hydrodeoxygenation reactor will contain sulphide compounds, for example, in concentrations of 10 to 2000 vol-ppm.

Hydrodeoxygenation can be carried out using excess hydrogen. Then, unreacted hydrogen is recovered and recycled. Hydrogen rich off-gas can be subjected to amine wash using, for example, monoethanolamine (MEA) or diethanolamine (DEA) to remove carbon dioxide. The amine will also remove sulphide compounds which will contaminate the amine and separation of carbon dioxide from the sulphide compounds from the amine compounds can require special arrangement.

For removing impurities, such as sulphides, from carbon dioxide rich gas at least one, a plurality of separate treatment steps are employed. Thus, various absorption materials can be utilized for separating sulphur compounds and carbon dioxide. These separation and wash processes are commercially applied for effective $CO_2$ removal at low sulphur contents. In addition, various heat treatments or guard beds are used.

WO 98/55209 discloses a method and system for removal of sulphur and sulphur-containing compounds from gas flows using aqueous metal salt solutions at acid conditions. The metal is regenerated by treating the sulphide precipitation at higher temperature with hydrogen to yield pure metal and $H_2S$. The $H_2S$ can be further treated for instance in a Claus unit to give elementary sulphur. WO 98/55209 is directed to the treatment of gas flows obtained of natural gas, coal gas or biogas, and similar hydrocarbon sources, employing high concentrations of the metal salts.

SUMMARY

According to an exemplary aspect, provided is a method of purifying a gas formed from a process wherein a glyceride containing raw material is converted to hydrocarbon paraffins, said gas containing a minimum of about 75 vol-% of hydrogen and/or carbon dioxide and at least one sulphide compound as an impurity, the method comprising: contacting the gas with an acidic aqueous wash solution of a transition metal ion; binding at least a portion of the at least one sulphide compound contained in the gas into a substantially insoluble transition metal sulphide compound; and separating the formed metal sulphide compound together with the wash solution from the gas to obtain a purified gas.

DETAILED DESCRIPTION

Figure 1:
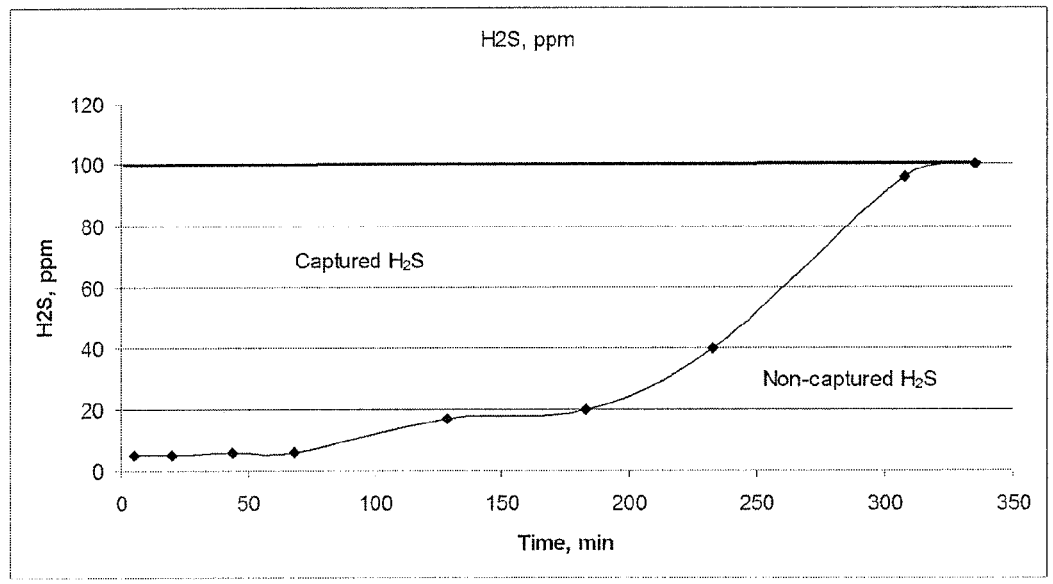
FIG. 1 is a graphical depiction of the results of Example 1, showing the proportion of captured $H_2S$ in vol.-ppm as a function of time, in accordance with an exemplary aspect.

According to an exemplary aspect, at least some of the problems of the art can be ameliorated or overcome. Provided is a method of purifying gas streams derived from a process wherein a glyceride containing raw material is converted to hydrocarbon paraffins.

In an exemplary aspect, the gas stream is contacted with an acidic aqueous wash solution of transition metal ions capable of binding to sulphide ions. With the transition metal ions a significant portion of the sulphide compounds contained in the gas are bound into practically insoluble transition metal sulphide compounds to remove sulphide compounds from the gas to produce a purified gas. The thus obtained purified gas can be recovered and used as such or further treatment can be conducted.

The absorption liquid can be contacted with the gas which is to be purified, for example, in a column, such as a tray or packed column, but other contacting devices can also be used. The absorption liquid can be applied by spraying, atomizing or bubbling. When absorbing sulphurous compounds to form metal sulphides also acidic compounds, such as hydrogen chloride will become absorbed. Further, the aqueous, metal ion containing solution can be applied in acidic form. In this form, it can be capable of absorbing such as ammonia ($NH_3$) and hydrogen chloride (HCl) as well as other alkaline and acidic impurities.

The method can efficiently lower sulphide concentrations to ppm or sub-ppm level and it can be implemented on an industrial scale with low investment costs. The metal, for example, transition metal such as copper, can be recovered.

Considerable advantages can be obtained. In an exemplary method, separate purification phases are combined. Impurities, such as $H_2S$, COS, $NH_3$, HCl, some organic compounds and small particles, are absorbed in water solution.

Precipitation of sulphides can be a more convenient and advantageous way of purifying $H_2S$ than traditional amine or methanol wash because it gives an additional driving force for mass transfer of $H_2S$ from the gas to the liquid phase. This is due to the fact that $H_2S$, $HS^-$ and $S^{2-}$ concentrations in the liquid phase are kept small due to the precipitation of $S^{2-}$ as metal sulphide. Using an acidic wash solution, also ammonia can be washed out from the gas.

The present process can be used in a plant producing hydrocarbon compositions which are suitable as such as diesel fuels or which can be processed into diesel fuels.

In an exemplary embodiment, the washing is carried out in a multi-stage process, for example, by counter-current washing. In such embodiment, an aqueous effluent can be withdrawn which is in practice totally free from metal ions derived from the washing liquid and which can be subjected to further treatment in a waste water processing plant.

It has been found that the implementation of an exemplary method can provide considerable advantages when carried out for gas streams derived from a process wherein glyceride containing raw-material is converted to hydrocarbon paraffins. The gaseous effluent of such a process contains as major component hydrogen or carbon dioxide or, for example, a combination of both.

In an exemplary embodiment, the gas stream forming a feedstock of the present method is formed by hydrogen gas containing a maximum of 15 vol-%, for example, a maximum of 12 vol-%, for example, about 0.1 to 10 vol-% of carbon dioxide.

The gaseous effluent of the above-mentioned process can be treated as such, or either of the two major components can be separated from the other and then treated by the present method.

The carbon dioxide can be separated from recycled hydrogen gas, for example, by chemical (e.g., amine) or physical processing and washing (in the following "washing process") and obtained from the regenerator of said washing process. When such a gas stream is treated by an exemplary method, the resulting carbon dioxide can be very pure. The purified carbon dioxide gas can meet foodstuff quality parameters and is suitable also for final deposition of the carbon dioxide.

In another exemplary embodiment, recycled hydrogen (containing carbon dioxide) of a decarboxylation process is first conducted to a treatment process followed by a carbon dioxide washer. Sulphides, such as hydrogen sulphide, mixtures thereof or other sulphur-containing compounds are thereby first removed. The carbon dioxide of this purified gas stream, for example, hydrogen gas stream, can be subjected to amine wash, physical absorption, e.g., in methanol, or another process designed for treatment of carbon dioxide. For example, this subsequent process step for treating carbon dioxide becomes more facile when there are no or practically no sulphide compounds, for example, no or practically no hydrogen sulphide. Removal of sulphide (such as hydrogen sulphide) simplifies, for example, amine wash considerably.

In an example applicable to the above embodiments, when hydrogen sulphide is removed from carbon dioxide gas, at least 95%, for example, at least 98%, for example, at least 99.5%, of the hydrogen sulphide is removed from the gas, which gives carbon dioxide containing less than 1 vol-ppm of hydrogen sulphide, for example, less than about 500 ppb, for example, less than about 250 ppb by volume.

Exemplary embodiments are described with reference to copper sulphate as an absorbing metal salt compound. Copper sulphate can be very efficient and employed in many embodiments. Other salts, for example, transition metal salts, which will be discussed later, can additionally or alternatively be used in the methods.

To the extent that numerical values and numerical ranges are indicated, approximate (e.g., "about") values are to be interpreted as also including the exact values.

As mentioned above, the disclosure relates to purification of gas obtained by conversion of glyceride raw material into hydrocarbon paraffins, useful as fuels or fuel components.

For example, the present technology provides a method of purifying a gas stream derived from a process wherein a glyceride containing raw material is converted to hydrocarbon paraffins. Thus, the gas is, for example, derived from a process in which the glyceride raw material is contacted with hydrogen, such reaction being exemplified by catalytic hydrotreatment of triglycerides comprising hydrogenation of double bonds in fatty acid chains and hydrodeoxygenation of triglyceride (decomposition of triglyceride structure).

The present method can also, equally well, be used for gas streams which are derived from conversion processes, such as decarboxylation, in which only minor concentrations of hydrogen, if any, are employed.

A great variety of raw materials can be processed by the above processes. Suitable glyceride containing raw materials for use in the process can be selected from the group of biological oils, natural fats and various combinations thereof.

The "glyceride containing raw material" denotes, for example, a feedstock which comprises various oils and/or fats originating from biological and renewable sources, e.g., fats and oils originating from plants and/or animals and/or fish and compounds derived from them as well as oils and fats and oils obtained from microbiological processes. Said oils and fats can comprise $C_{10}$-$C_{24}$ fatty acids, derivatives thereof, such as esters of fatty acids as well as triglycerides of fatty acids or combinations of thereof. Fatty acids or fatty acid derivatives, such as esters, may be produced via hydrolysis of said oils and fats or by their fractionalization or transesterification reactions of triglycerides or by microbiological processes utilizing algae or microbes, such as yeasts, molds or bacteria.

The basic structural unit of said oil or fat is a triglyceride. For example, diglycerides and free fatty acids can also be comprised therein. Triglyceride is a triester of glycerol with three fatty acid molecules, having the structure presented in the following formula I:

Formula I

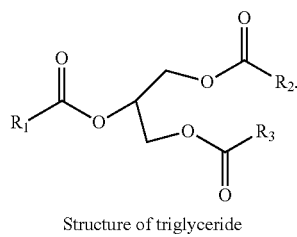

Structure of triglyceride

In Formula I, $R_1$, $R_2$ and $R_3$ are alkyl chains. Fatty acids found in natural triglycerides can be almost solely fatty acids of even carbon number. Therefore, $R_1$, $R_2$, and $R_3$ can be $C_5$-$C_{23}$ alkyl groups, for example, $C_{11}$-$C_{19}$ alkyl groups, for example, $C_{15}$ or $C_{17}$ alkyl groups. $R_1$, $R_2$, and $R_3$ may contain carbon-carbon double bonds. These alkyl chains can be saturated, unsaturated or polyunsaturated. In case one of the $R_1$, $R_2$ or $R_3$ is hydrogen, then Formula I represents diglycerides, and if two of these are hydrogen then the formula represents a monoglyceride, which both might be present in oils and fats, for example, in their processing products.

The natural fat as a "glyceride containing raw material" can be an animal or plant fat or oil (here, oils are defined as fats) selected from: the lauric-myristic acid group ($C_{12}$ to $C_{14}$) including milk fats, as well as coconut oil, palmseed oil, babassu oil, muscat butter oil, laurel seed oil; from the palmitic acid group ($C_{16}$) including earth animal fats, as well as palm oil and stillingia tallow; the stearic acid group ($C_{18}$) including fats of earth animals, as well as cocoa butter, shea butter and Borneo tallow; the oleic and linoleic acid group (unsaturated $C_{18}$) including whale and fish oils as well as tall oil (fatty acid fraction), rapeseed or canola oil, olive oil, peanut oil, sesame oil, maize oil, sunflower oil, poppy seed oil, cottonseed oil and soy oil; the linolenic acid group (unsaturated $C_{18}$) further including linseed oil, perilla oil and hemp oil; the erucic acid group (unsaturated $C_{22}$) including whale and fish oils as well as rapeseed oil and mustard seed oil; the eleostearic acid group (conjug. unsaturated $C_{18}$) including whale and fish oils as well as Chinese wood oil; and fats with substituted fatty acids (ricinoleic acid, $C_{18}$) such as castor oil. Suitable oils or fats are also Jatropha seed oils as well as fats and oils originating from processes using microbes, such as algae, bacteria, yeasts and moulds.

Derivatives of natural fats include mono- or diglycerides of $C_{10}$ to $C_{28}$ fatty acids, $C_{10}$ to $C_{28}$ fatty acids, $C_{10}$ to $C_{28}$ fatty acid anhydrides, non-glyceride $C_{10}$ to $C_{28}$ fatty acid esters, $C_{10}$ to $C_{28}$ fatty alcohols, $C_{10}$ to $C_{28}$ fatty aldehydes and $C_{10}$ to $C_{28}$ fatty ketones. The $C_{10}$ to $C_{28}$ fatty acids, their mono- and diglycerides, as well as their anhydrides can be prepared by hydrolysis of the corresponding triglyceride. The non-glyceride $C_{10}$ to $C_{28}$ fatty acid esters can be prepared from the triglycerides by transesterification. The $C_{10}$ to $C_{28}$ fatty alcohols, aldehydes and ketones are prepared by reduction, for example, by hydrogenation, of the corresponding fatty acids.

The derivatives of natural fats can also include any of the aforementioned natural fats and derivatives, the hydrocarbon chain of which has been modified, e.g., by substitution, branching or saturation.

The natural fats or derivatives thereof can be provided in pure form or as part of a feedstock containing other components. The triglycerides can also be prehydrogenated in order to reduce unsaturation, sulphur and nitrogen content.

Fuels or fuel components can be obtained from the raw materials by a number of processes. Examples include:

hydrogenation of fatty acids, their esters and glycerides, including mono-, di- and triglycerides;

hydrodeoxygenation of fatty acids, their esters and glycerides, including mono-, di- and triglycerides; and hydrocracking of fatty acids, their esters and glycerides, including mono-, di- and triglycerides.

Further, an exemplary method can be applied to remove sulphide compounds from a gas rich in carbon oxides produced by a decarb reaction selected from decarboxylation and decarbonylation reactions and combinations thereof, wherein one-less-carbon n-paraffins are produced from the analogous fatty acids or carboxylic acid parts of glycerides along with carbon oxides.

It is also possible to combine said processes.

Herein, by "deoxygenation" is meant partial or complete removal of oxygen from the molecules of the above-mentioned glycerides, i.e. triglycerides, fatty acids, fatty acid analogues or derivatives. The deoxygenation operation may involve, for example, hydrogenation (reaction with hydrogen).

The process also comprises steps involving hydrolysis (reaction with water), decarbonylation (removal of carbonyl as carbon monoxide) and/or decarboxylation (removal of carboxyl as carbon dioxide).

Products of a deoxygenation step comprise aliphatic $C_9$ to $C_{28}$ hydrocarbons, for example, aliphatic $C_{11}$ to $C_{24}$ hydrocarbons, for example, aliphatic $C_{11}$ to $C_{20}$ hydrocarbons, for example, aliphatic $C_{15}$ to $C_{18}$ hydrocarbons.

$C_9$ to $C_{28}$ hydrocarbons obtained from deoxygenation can exhibit low amounts of unsaturation and heteroatom impurities. Such hydrocarbons can be suitable for hydroisomerization to produce diesel fuel/components or for hydrocracking to form lower hydrocarbons. Optionally, the hydrocracking is carried out after a purification step.

In hydrocracking, aliphatic light hydrocarbons are formed such as gasoline. Thus, it is exemplary to produce by the hydrocracking step aliphatic $C_2$ to $C_{14}$ hydrocarbons, such as aliphatic $C_2$ to $C_8$ hydrocarbons, i.e., light gasoline.

An exemplary process for deoxygenating starting materials originating from renewable sources is the one mentioned above (EP 1 681 337) which comprises an alternative reaction route—decarboxylation/decarbonylation, where oxygen is removed in the form of CO and $CO_2$ from the original compounds in the starting material/feedstock. In this way, hydrocarbons can be manufactured from plant and vegetable oils and fats as well as animal and fish oils and fats without high consumption of hydrogen. In an exemplary process for manufacturing hydrocarbons in the diesel fuel distillation range from renewable sources, hydrogen is employed only for the reduction of the catalyst. The content of EP 1 681 337 is herewith incorporated by reference.

The present method can be applied to a gas stream obtained from any of the above processes.

The gas stream contains gaseous (e.g., non-condensable) components, such as hydrogen or carbon dioxide or combinations thereof, which make up a large majority of its volume. For example, at least 75 vol.-%, for example, at least 80 vol.-% and up to about 99 vol.-%, of the gas stream is formed by hydrogen or carbon dioxide.

Thus, for example, a hydrogen gas flow subjected to a treatment according to an exemplary aspect can always contain some other gas components and some impurities, for example, impurities in the form of other gaseous components. Although the concentration of such impurities is relatively small, it may still be significant enough to impair further treatment of the main gas components of the gas stream. As explained above, particularly interesting sources of gas streams intended for the present treatment are processes in which fatty acids, their esters and glycerides, including mono-, di- and triglycerides are hydrogened, hydrodeoxygenated and/or hydrocracked, in general, decarboxylated.

Decarboxylation generates carbon dioxide and it can be desirable to recover same as pure as possible with regard to further use. To achieve this, for example, sulphides, for example, hydrogen sulphide, and similar sulphur-containing compounds can be separated. The recovery process can be directed towards the gas composition circulating in the recycle line of the hydrogen gas, for example, in a decarboxylation process.

If desired, the step of contacting the gas with the wash solution (which will be described below) can be preceded by at least one purification step of the gas, wherein the carbon oxide gas, for example, carbon dioxide-rich gas, to be treated is an off-gas of the process.

Thus, as an example, the present washing method can be carried out on a carbon dioxide-rich gas recovered from amine washing.

In addition to one or several main components, there can also be minor components. Such low-concentration compounds may include lower hydrocarbons. There are sulphurous components. These impurity components can be formed from sulphide compounds, such as hydrogen sulphide ($H_2S$), carbonyl sulphide (COS) or organic sulphides or combinations and mixtures of such compounds. In practice, the gas may contain at least 0.1 vol.-ppm of sulphide compounds, for example, about 1 vol.-ppm to 1 vol.-%, for example, about 3 to 5000 vol.-ppm, of sulphide compounds.

A hydrogen-rich gas can contain, in addition to sulphides, other gaseous impurity components such as carbon monoxide, carbon dioxide or lower alkanes, such as methane, ethane, propane and butane(s), or combinations thereof.

According to one embodiment, which relates to the treatment of a hydrogen-rich gas, the gas to be purified is a recycle gas discharged from an HDO reactor. The gas is cooled whereby the heaviest hydrocarbons and water are mainly condensed.

In another embodiment, the carbon dioxide containing gas is generated in the regeneration step of an amine solution emanating from an amine purification system wherein dissolved gases in the amine are released before the amine solution is recycled.

The temperature of the gas can be about 20 to 70° C., for example, 30 to 50° C., for example, about 40° C.

The gas is contacted with an acidic aqueous wash solution of transition metal ions capable of binding to sulphide ions, and a significant portion of the sulphide compounds contained in the gas are bound into solid sulphides which have low solubility and which can therefore be precipitated from the solution.

In an exemplary embodiment, the present method can be carried out by contacting the gas with an acidic aqueous wash solution containing transition metal ions capable of binding to sulphide ions of the sulphide compounds present in the gas. The concentration of the transition metal cations can be small. For example, the aqueous solution can have a concentration of the transition metal ion(s) of 0.00001 M to 0.1 M, for example 0.00001 M to 0.01 M, for example, about 0.00005 M to 0.005 M, for example, about 0.0001 M to 0.001 M.

In an exemplary embodiment, the metal ions, i.e., cations, of the wash solution are derived from transition metals selected from the group of copper, zinc, iron and cobalt and mixtures thereof, for example, from copper, zinc and iron and mixtures thereof. Advantageously, the metal ions of the wash solution comprise bivalent metal cations of copper, zinc and iron and mixtures thereof.

The transition metal ions are obtained from water soluble metal salts by dissolving said salts in water. In one embodiment, the aqueous solution is prepared by dissolving about 1 to about 10,000 parts, for example, about 50 to about 5,000 parts by weight of a metal salt into 1,000,000 parts by weight of water.

For the preparation of suitable wash solutions, the water soluble metal salts of the above mentioned cations can comprise an anion selected from the group of anions derived from inorganic acids, such as sulphate, sulphite, phosphate, phosphite, nitrate, chloride and carbonate and mixtures thereof. Anions derived from simple organic acids (for example, of the kind having no more than 10 carbon atoms for example 6 or less carbon atoms) are also possible. Examples of such anions are citrate, malonate and acetate and mixtures thereof.

Based on the above, specific non-limiting examples of anions include the following: sulphate, sulphite, bisulphite, thiosulphate, chloride, iodide, phosphate, monobasic phosphate, dibasic phosphate, hypophosphite, dihydrogen pyrophosphate, carbonate, bicarbonate, metasilicate, citrate, malate, maleate, malonate, succinate, lactate, formate, acetate, butyrate, propionate, benzoate, tartrate, ascorbate and gluconate.

With reference to the above, in an exemplary embodiment, the combinations of the metal cations and anions are selected such that the metal salt obtained is water soluble.

The salt may also be a hydrated salt. Such salts can be crystalline salt hydrates with one or more bonded water molecules of crystallization.

$CuSO_4$ solution can be prepared either by dissolving $CuSO_4$ powder in water or reacting CuO powder with a solution of $H_2SO_4$ and water. In the first case, $H_2SO_4$ formed can be removed from any circulating washing fluid. In the second case $H_2SO_4$ formed will react with CuO producing the desired $Cu^{2+}$ and $SO_4^{2-}$ ions. Additionally, metallic Cu powder with $H_2SO_4$ water solution produces $CuSO_4$ water solution and hydrogen.

In an exemplary embodiment, the aqueous wash solution is acidic or weakly acidic. For example, it can have a pH of about 1 to about 6.5, for example, about 1 to about 5. The pH will vary within the indicated range depending on the metal cations.

The molar ratio of the metal ion to sulphide compounds of the gas to be purified is in excess of about 1, for example, about 1.4 to about 6, for example, about 1.5 to about 5.5, for example, about 2 to about 4.5.

In an example, aqueous copper sulfate precipitates hydrogen sulfide as copper sulfide according to Formula I:

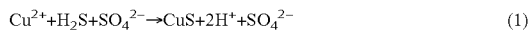

$$Cu^{2+}+H_2S+SO_4^{2-} \rightarrow CuS+2H^++SO_4^{2-} \quad (1)$$

Generally, the absorption of $H_2S$ from the gas to be treated into $Me-SO_4$-water solution (wherein Me stands for a metal, in particular a transition metal, such as copper, iron, zinc or cobalt) can be a mass transfer limited process. $H_2S$ can be dissolved in liquid phase where the reaction of $H_2S$ and $Me-SO_4$ takes place fast. $Me^{2+}$ ions and $H_2S$ can be present in liquid film where the reaction takes place and mass transfer of $H_2S$ and $Me^{2+}$ ions into liquid film are limiting the reactions. Reaction of $Me^{2+}$ ions with $H_2S$ forms MeS, which will precipitate as small crystals effectively because of low solubility of the sulphide in water.

The crystals are formed by nucleation and crystal growth mechanisms. The nucleation and crystal growth rate depend on the supersaturation of $Me^{2+}$ and $S^{2-}$ ions in film. Mass transfer may depend also on nucleation rate, which affects the $Me^{2+}$ and $S^{2-}$ concentrations.

Thus, a significant portion of the sulphide impurities present and contained in the gas can be converted into the form of transition metal sulphide compounds. The sulphide compounds so formed can be precipitated into the wash solution whereby the sulphide impurities are removed from the gas. The purified gas so obtained is separated from the aqueous solution.

For example, a significant portion of the hydrogen sulphide impurities contained in the gas are bound into practically insoluble (i.e., sparingly soluble) transition metal sulphide compounds.

Also other components in the gas to be treated, such as $CO_2$, $NH_3$, can be dissolved and reacted.

In an exemplary embodiment, the pH of the ion system is within a specific range depending on the metal ion used. In an example, for copper, i.e., $Cu^{2+}$, pH can be approximately within the range of 1 to 5.2 to reduce or prevent precipitation of components other than CuS, such as $CuCO_3$, $Cu(OH)_2$, and $(NH_4)_2SO_4$ depending on the $CuSO_4$-water solution concentration and gas composition, and the total pressure and temperature.

Additionally, $H_2S$ is precipitated from liquid as sulphides with metal ions. Because the solubility of metal sulphides is very low, lean metal ion concentrations can be used and efficient precipitation is still achieved.

By an exemplary method, a significant portion of the hydrogen sulphide is removed from the gas. For example, at least 95%, for example, at least 98%, for example, at least 99.5%, of the hydrogen sulphide is removed from the gas. The concentration of hydrogen sulphide of the purified gas can be less than about 500 ppb, for example, less than about 250 ppb by volume. In one embodiment, the concentration of hydrogen sulphide of the purified gas is less than about 100 ppb.

For example, the gas is contacted with the wash solution at a temperature in the range of 10 and 80° C. and at a pressure in the range from 1 to 50 bar (absolute pressure). Thus, the washing can be carried out at ambient temperature and pressure (20 to 25° C. and 1 bar(a)), although it is equally possible to use the present technology at lower temperatures (for example, 10 to <20° C.) and at elevated temperatures (for example, >25 to 80° C.). The pressure can be in excess of 1 bar(a), for example about 1.5 to about 50 bar(a).

There are several options for contacting of the gas with the washing liquid/absorption medium.

In a first exemplary embodiment, the contacting of the gas with the absorption medium takes place by spraying or atomizing the absorption medium into the gas. For example, the contacting of the gas with the absorption medium takes place in the interface between the gas and droplets of the absorption medium.

In this embodiment, the step of contacting the gas to be purified with the wash solution comprises spraying droplets of the wash solution into the gas, maintained in gaseous phase, and precipitating the absorbed sulphur compound in the form of solid metal sulphide in the droplets of the wash solution.

The wash solution can be contacted with the gas in a spray chamber having, for example, a substantially vertical central axis. Said gas can be fed into the spray chamber so as to advance in the direction of the central axis of the spray chamber. The wash solution can be fed through spray nozzles arranged to provide one or more spray zones in series along the central axis at different heights in the spray chamber.

Furthermore, in an exemplary embodiment, the gas is fed into the spray chamber via gas distributors arranged below the lowest spray zone, and the metal sulphide is withdrawn from the reactor along with the used wash liquid via an outlet arranged in the bottom part of the chamber.

In a second exemplary embodiment, the gas to be purified is bubbled into a stirred tank containing the absorption solution.

In a third embodiment, absorption towers with plates and/or packing can be used in a counter-current operation. The detailed equipment type depends on the concentration of the metal ions in the solution and the amount and impurity content of the gas.

For example, the wash solution contains less than 1500 wt-ppm as metal, for example, less than 1000 wt-ppm, for example, about 10 to about 450 wt-ppm, of a copper salt, for example, copper sulphate.

In an exemplary embodiment, washing is performed in several steps, in which the concentration of the washing liquid can be the same or different. In an exemplary embodiment, washing liquids having 2 or more different concentrations are employed. Thus, in a first stage, the inlet gas is contacted with a washing liquid which contains less than a stoichiometric amount of metal ions with respect to the sulphide compounds present, and in a second stage of the process, the gas treated is contacted with a washing liquid which contains an excess of metal ions with respect to the sulphide compounds present in the gas.

In an exemplary embodiment, Washing can be carried out such that the gas to be purified will first meet a solution that has a first concentration of $Cu^{2+}$ ions, whereas at the last contact point between the gas and the washing solution the washing solution has a second concentration of $Cu^{2+}$ ions, said second concentration being at least 2 times, for example, at least 5 times greater, for example, 10 times greater, than the first concentration.

The recovered purified gas can be fed to further processing, e.g., to amine washing.

A purified hydrogen-rich gas can be used, optionally combined with fresh feed, for hydrotreatment of triglyceride raw material, for example, in a process for hydrotreating in a hydrotreating step and the isomerising in an isomerisation step a feed of biological oils, natural fats and their processing products, such as free fatty acids and stearin or combinations thereof.

In one embodiment, a method of processing a glyceride containing raw-material and of treating a gas stream is provided, comprising the steps of
- converting a glyceride containing raw-material to hydrogen paraffins;
- optionally recovering said hydrogen paraffins;
- recovering from the converting step a gas stream containing a minimum of about 75 vol-% of hydrogen or carbon dioxide as a major component and at least one sulphide compound as an impurity;
- contacting the gas with an acidic aqueous wash solution of transition metal ions;
- binding a significant portion of the sulphide compounds contained in the gas into practically insoluble transition metal sulphide compounds; and
- separating the formed metal sulphide compounds together with the wash solution from the gas to obtain the purified gas.

This method can be combined with any of the embodiments discussed above. Thus, the various method steps can be carried out as explained above.

In an exemplary embodiment, the gas stream comprises carbon dioxide separated from recycled hydrogen gas obtained by decarboxylation.

In an exemplary embodiment, the gas stream comprising carbon dioxide is purified to produce a purified stream of carbon dioxide which is separately recovered.

In an exemplary embodiment, said gas stream is a stream of hydrogen gas containing carbon dioxide, said gas stream being conducted to a treatment process, wherein sulphides or other sulphur-containing compounds or combinations thereof are removed to yield a purified gas stream, and the carbon dioxide of this purified gas stream is subjected to a process for removing carbon dioxide.

In an exemplary embodiment, the stream of hydrogen gas contains a maximum of 10 vol-%, for example, 0.1 to 7.5 vol-% of carbon dioxide.

In an exemplary embodiment, hydrogen sulphide is removed from the gas, wherein at least 95%, for example, at least 98%, for example, at least 99.5%, of the hydrogen sulphide is removed from the gas, to provide carbon dioxide containing less than 1 vol-ppm of hydrogen sulphide, for example, less than about 500 ppb, for example, less than about 250 ppb by volume.

EXAMPLES

The following examples are given for illustrative purposes only.

In the following experiments, a laboratory equipment set up was employed in which gas to be purified was passed from a pressure vessel through a pressure regulator and a mass flow meter and then bubbled into a glass bottle near the bottom. The solution in the bottle was agitated with a magnetic stirrer to improve mass transfer between gas and liquid phase. When the gas bubbles rose up from the solution a slight over-pressure was generated in the bottle which forced the gas to enter the outlet tube. The tube was provided with a nozzle to which a $H_2S$ selective Dräger-tube was connected. After the Dräger-tube the gas entered a Ritter drum-type gas meter and from there it was conducted to ventilation. It was possible to bypass the Dräger-tube by suitably turning valves in the tubing.

The mass flow meter was calibrated for $CO_2$ in Examples 1 and 2, where 100 vol-ppm $H_2S$ in $CO_2$ gas was used. In Examples 3 and 4 the same mass flow meter was used without new calibration, so that the mass flow meter was only used for flow value setting and the results are calculated based on the Ritter drum-type gas meter that was installed as the last equipment before the gas entered the ventilation.

In Examples 3 and 4, the gas was coming from a special gas sample bomb of 1 gallon volume, ordered just for these tests. The gas used was taken from a hydrogen stream of an industrial process treating natural fats by hydrodeoxygenation.

Only the $H_2S$ content of the gas coming out from the absorber bottle was analyzed because the other gases did not dissolve in the $CuSO_4$ solution. Normally, Dräger-tubes are used so that a certain volume of gas is pumped through the tube and the colour change in the tube indicates the $H_2S$ content of the gas. In the present experiments the gas passed through the Dräger-tube for a certain time and the indication of the Ritter drum-type gas meter was recorded.

The solution pH was measured before and after the experiment. The precipitated CuS solid was not analysed in these tests.

All experiments were carried out at laboratory temperature; heating or cooling was not used. The temperature was approximately between 20 and 25° C.

A $CuSO_4$ solution was prepared using $CuSO_4.5H_2O$ and ion exchanged water. First, a solution of 15 mass-% was prepared and all solutions used were then diluted from it.

The concentrations employed were 0.005 mass-% $CuSO_4$, 0.01 mass-% $CuSO_4$, 0.05 mass-% $CuSO_4$, and 0.1 mass-% $CuSO_4$.

The gas in Examples 1 and 2 was supplied by AGA. It contained 100 vol-ppm of $H_2S$ in $CO_2$. This delivered pressure vessel had initially a higher pressure, but it was reduced to 10 bar (abs.) using a pressure regulator. This gas was then passed through a mass flowmeter, which was calibrated for $CO_2$.

In Examples 3 and 4 gas from a hydrogen stream of a natural fat hydrodeoxygenation process was obtained using a 1 gallon gas sample bomb. The analysis of this gas was obtained from the process on-line analyser of the gas stream.

Example 1

The test was carried out using the following materials:
Gas: AGA, 100 vol-ppm $H_2S$ in $CO_2$
Gas bottle outlet pressure regulated to 10 bar (abs.)
Gas flow adjusted with mass flow meter: 10 litres/hour
$CuSO_4$ solution: 0.01 mass-% $CuSO_4$ in ion exchanged water, pH 5, 250 ml
Dräger-tubes: range 5-60 vol.-ppm $H_2S$ (1 litre of gas used in analysis)

The pH of the prepared $CuSO_4$ solution was measured using a pH indicator paper. Then, 250 ml of this 0.01 mass-% $CuSO_4$ solution was placed in the absorption bottle. The magnetic stirrer bar was added to bottle and the bottle was closed. All gas lines were checked and correct valves opened.

The mass flow meter was set to 10 litres/hour. The pressure regulator of the gas bottle was set to 10 bar (abs.). Then the gas flow was started. The Ritter drum-type gas meter indication and time was recorded.

Then Dräger-tubes for the range 5-60 vol.-ppm $H_2S$ were used. As the gas flow through the Dräger-tube was started the time and Ritter drum-type gas meter indication were recorded. When a suitable volume of the gas had passed through the Dräger-tube the gas flow was directed through the bypass by opening and closing valves. Again at that point the time and Ritter drum-type gas meter indication were recorded in addition to the reading from the Dräger-tube. Then the Dräger-tube was changed to a new one and the $H_2S$ content measurement was repeated. The experiment continued to the point that the Dräger-tube measurement indicated that the $H_2S$ content is the same as in the feed of the absorption bottle. This also means that all copper(II) ions have been depleted from the solution.

The $H_2S$ vol.-ppm values were measured from the outlet gas of the $CuSO_4$ absorption bottle.

The pH of the solution was 5 after the test.

Dräger-tubes: range 5-60 vol.-ppm $H_2S$ (1 litre of gas used in analysis)

The bubbling was continued overnight. The measured pH at the end of the experiment was 2, showing that the formation of sulphuric acid has taken place in the solution, i.e., copper ions of the copper(II)sulphate solution have been replaced by $H_3O^+$ ions formed from water and the hydrogen from the hydrogen sulphide. The copper(II) ions have been combined with $S^{2-}$ ions to form practically insoluble CuS that have been precipitated out of the solution.

The $H_2S$ vol.-ppm values were determined at $CuSO_4$ absorption bottle outlet gas.

TABLE 1

Results of copper sulphate washing of laboratory gas

| Time | Ritter, liters | Dräger in use | Gas flow through Dräger-tube, liter | Dräger-tube indication, vol-ppm | $H_2S$-content in gas, vol-ppm | Notes |
|---|---|---|---|---|---|---|
| 9:13 | Gas flow on | | | | | |
| 9:20 | 355033.45 | | | | | |
| 9:22 | 355033.80 | Start | | | | |
| 9:27 | 355034.40 | Stop | 0.60 | 3 | 5 | Small particles |
| 9:39 | 355036.45 | Start | | | | |
| 9:41 | 355036.65 | Stop | 0.20 | 1 | 5 | More particles |
| 10:02 | 355040.20 | Start | | | | |
| 10:06 | 355040.70 | Stop | 0.50 | 3 | 6 | |
| 10:26 | 355044.20 | Start | | | | |
| 10:30 | 355044.70 | Stop | 0.50 | 3 | 6 | |
| 11:36 | 355055.80 | Start | | | | |
| 11:40 | 355056.40 | Stop | 0.60 | 10 | 16.7 | |
| 12:32 | 355065.20 | Start | | | | |
| 12:36 | 355065.80 | Stop | 0.60 | 12 | 20 | |
| 13:11 | 355071.70 | Start | | | | |
| 13:14 | 355072.20 | Stop | 0.50 | 20 | 40 | |
| 14:26 | 355084.30 | Start | | | | |
| 14:29 | 355084.82 | Stop | 0.52 | 50 | 96 | |
| 14:53 | 355088.80 | Start | | | | |
| 14:56 | 355089.30 | Stop | 0.50 | 50 | 100 | |
| 14:57 | Gas flow off | | | | | |

The results are also shown graphically in FIG. 1.

From the balances it can be calculated that 250 ml of 0.01 mass-% $CuSO_4$ solution contains $156.6 \cdot 10^{-6}$ moles of Cu. This is the maximum amount of moles of $H_2S$ that can be removed from the gas as solid CuS. From the balance calculation, the processed gas contained a total of $249.0 \cdot 10^{-6}$ moles of $H_2S$. The balance calculation shows that in this case 67.2% is the maximum amount of $H_2S$ that could have been removed.

The actual result is visible in FIG. 1 as the area of captured $H_2S$. Integration of the captured and non-captured areas using trapezoidal approximation between points gives result that 68.7% of $H_2S$ have been captured. This result is reasonably accurate taken into account that the analyses were carried out using Dräger-tubes. This means that practically all copper ions from the solution have been depleted and precipitated as CuS.

Example 2

The test was carried out using the following materials:
Gas: AGA, 100 vol-ppm $H_2S$ in $CO_2$
Gas bottle outlet pressure regulated to 10 bar (abs.)
Gas flow adjusted with mass flow meter: 10 litres/hour
$CuSO_4$ solution: 0.1 mass-% $CuSO_4$ in ion exchanged water, pH 5, 250 ml

TABLE 2

Results of copper sulphate washing of laboratory gas

| Time | Ritter, liters | Dräger in use | Gas flow through Dräger-tube, liter | Dräger-tube indication, vol-ppm | $H_2S$-content in gas, vol-ppm | Notes |
|---|---|---|---|---|---|---|
| 7:45 | Gas flow on | | | | | |
| 7:53 | 355096.85 | | | | | |
| 7:56 | 355097.20 | Start | | | | |
| 8:00 | 355097.70 | Stop | 0.50 | 0 | 0 | Small black particles |
| 8:28 | 355102.40 | Start | | | | |
| 8:32 | 355102.90 | Stop | 0.50 | 1 | 2 | |
| 9:32 | 355113.20 | Start | | | | |
| 9:36 | 355113.70 | Stop | 0.50 | 1 | 2 | More particles |
| 10:27 | 355122.40 | Start | | | | |
| 10:31 | 355139.90 | Stop | 0.50 | 1 | 2 | |
| 12:05 | 355138.90 | Start | | | | |
| 12:09 | 355139.40 | Stop | 0.50 | 1 | 2 | |
| 15:21 | 355171.70 | Start | | | | |
| 15:24 | 355172.20 | Stop | 0.50 | 3 | 6 | |
| 1.3.2012-2.3.2012 | Bubbling continues overnight | | | | | |
| 8:22 | 355344.30 | Start | | | | |
| 8:25 | 355344.80 | Stop | 0.50 | 6 | 12 | A lot of black precipitate |
| 11:57 | 355380.90 | Start | | | | |
| 12:01 | 355381.40 | Stop | 0.50 | 8 | 16 | |
| 13:17 | 355394.40 | Start | | | | |
| 13:20 | 355394.90 | Stop | 0.50 | 11 | 22 | |
| 14:55 | 355411.00 | Start | | | | |
| 14:58 | 355411.50 | Stop | 0.50 | 11 | 22 | |
| 14:59 | Gas flow off | | | | | |

Figure 2:
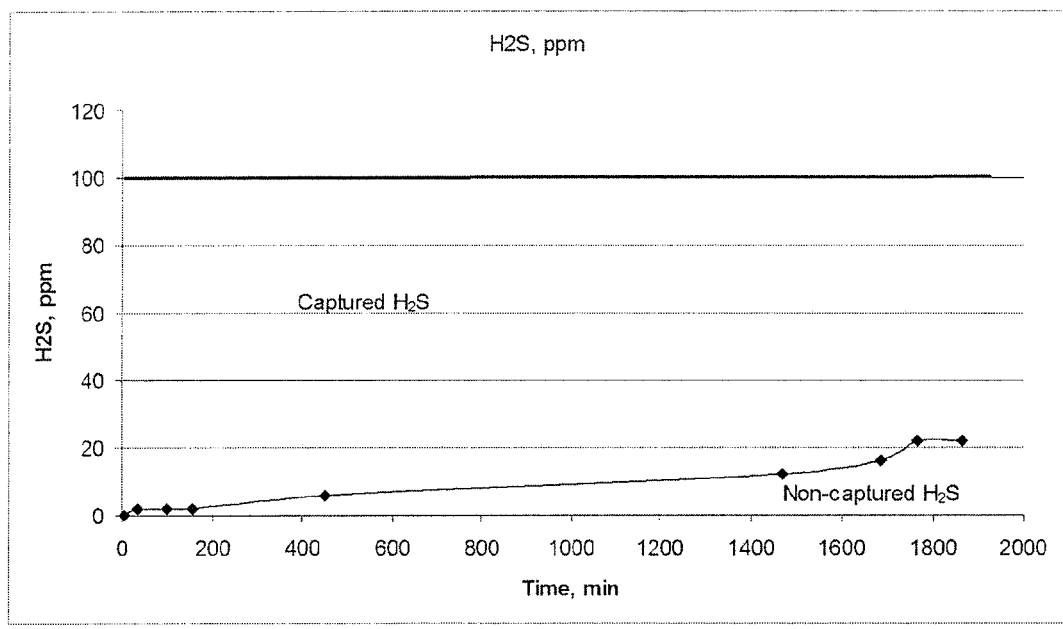
FIG. 2 is a graphical depiction of the results of Example 2, showing the proportion of captured $H_2S$ in vol-ppm as a function of time, in accordance with an exemplary aspect.

The results are also shown graphically in FIG. 2.

From the balances it can be calculated that 250 ml of 0.10 mass-% $CuSO_4$ solution contains $1.566 \cdot 10^{-3}$ moles of Cu. This is the maximum amount of moles of $H_2S$ that can be removed from the gas as solid CuS. From the gas flow balance calculation, the processed gas contained a total of $1.404 \cdot 10^{-3}$ moles of $H_2S$. This means that not all copper ions from the solution have been depleted and precipitated as CuS. The balance calculation shows that in this case 1.116 was the $Cu^{2+}$ ion molar ratio to the $H_2S$ in the totally processed feed. Thus it could have been possible to continue the test and remove more hydrogen sulphide from the gas.

The actually captured $H_2S$ will appear from FIG. 2 as the area over the curve. Integration of the captured and non-captured areas using trapezoidal approximation between points gives result that 90.7% of $H_2S$ fed through the $CuSO_4$ solution have been captured.

This experiment was carried out as one mixed stage. If the gas bubbles have been smaller, e.g. using a sinter in the gas feed to the bottle, the mass transfer would have been better and the percentage of the captured $H_2S$ would have been higher. Due to the possible blockage of the sinter pores with solid CuS the sinter was not used. Also, it can be concluded that by proper design of a continuous multistage counter current absorber the cleaned gas would contain $H_2S$ on the ppm or sub-ppm level.

Example 3

The equipment used was the same as in Examples 1 and 2. In the present example and in Example 4 below, the feed gas was provided by a special one gallon (3.8 litres) sample bomb filled into 20 bars in the process and connected to the feed gas line in the laboratory.

The test was carried out using the following materials:
Gas: Gas from a hydrogen stream of a natural fat hydrodeoxygenation process analysis given in Table 3. The particular gas sample was taken into special 1 gallon sample bomb.

TABLE 3

Analysis of the gas from a hydrogen stream of a natural fat hydrodeoxygenation process

| Component | Concentration, mol-% |
|---|---|
| Hydrogen | 93.3 |
| Carbon monoxide | 0.41 |
| Carbon dioxide | 1.73 |
| Hydrogensulphide | <0.1 |
| Methane | 1 |
| Ethane | 0.2 |
| Propane | 3.2 |
| C2 + C3 | 3.4 |
| C4 Total | 0.1 |
| | Concentration, ppm |
| Ammonia | <2 |

Gas sample bomb outlet pressure regulated to 5 bar (abs.)
Gas flow adjusted with mass flow meter: 10 liters/hour
$CuSO_4$ solution: 0.005 mass-% $CuSO_4$ in ion exchanged water, pH 5, 250 ml
Dräger-tubes: range 5-60 vol.-ppm $H_2S$ (1 liter of gas used in analysis)

The feed gas sample bomb was kept in a thermo stated (+20° C.) shelter outside to guarantee even quality of the feed gas (no condensation of heavy components) during the experiments.

The solution pH after the test was 5. The pH value did not change in this test. The $H_2S$ vol-ppm values were determined at $CuSO_4$ absorption bottle outlet gas.

The results of the copper sulphate washing are given in Table 4:

TABLE 4

Results of copper sulphate washing of industrial gas

| Time | Ritter, liters | Dräger in use | Gas flow through Dräger-tube, liter | Dräger-tube indication, vol-ppm | $H_2S$-content in gas, vol-ppm | Notes |
|---|---|---|---|---|---|---|
| 9:37 | | Gas flow on | | | | |
| 9:40 | 355415.66 | | | | | |
| 9:44 | 355416.55 | Start | | | | |
| 9:47 | 355417.05 | Stop | 0.50 | 28 | 56 | Solution light brown |
| 9:57 | 355419.10 | Start | | | | |
| 9:58 | 355419.40 | Stop | 0.30 | 46 | 153 | Solution light brown, no precipitate |
| 10:07 | 355421.40 | Start | | | | |
| 10:08 | 355421.60 | Stop | 0.20 | 51 | 255 | |
| 10:19 | 355423.90 | Start | | | | |
| 10:20 | 355423.95 | Stop | 0.05 | 200 | 400 | A Dräger-tube 10-200 ppm $H_2S$ in 0.1 liters of gas was used |
| 10:32 | 355426.45 | Start | | | | |
| 10:33 | 355426.60 | Stop | 0.15 | 61 | 407 | |
| 10:44 | 355429.10 | Start | | | | |
| 10:45 | 355429.20 | Stop | 0.10 | 45 | 450 | |
| 10:48 | 355430.00 | Gas flow off | | | | |

Figure 3:
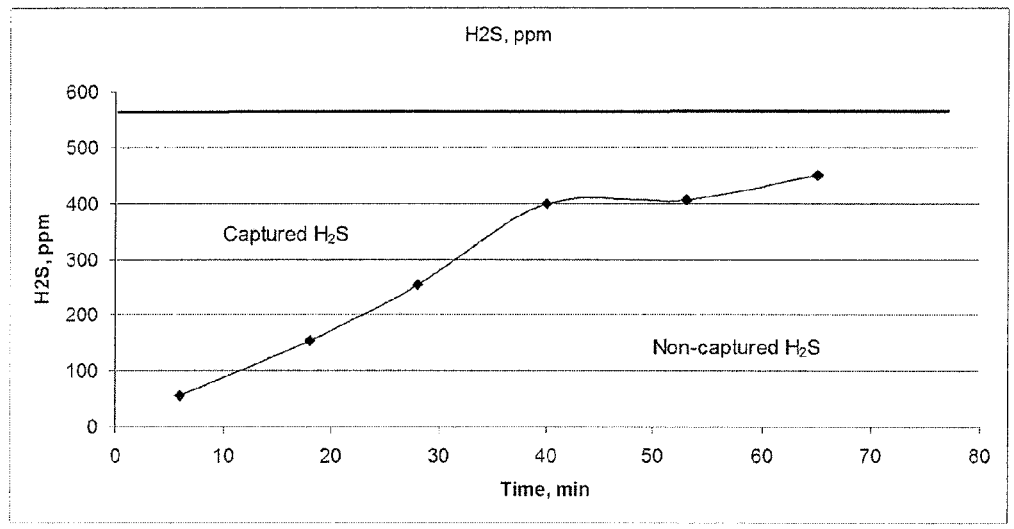
FIG. 3 is a graphical depiction of the results of Example 3, showing the proportion of captured $H_2S$ in vol-ppm as a function of time, in accordance with an exemplary aspect.

FIG. 3 shows the same results in graphical form.

From the balances it can be calculated that 250 ml of 0.005 mass-% $CuSO_4$ solution contains $78.3 \cdot 10^{-6}$ moles of Cu. This is the maximum amount of moles of $H_2S$ that can be removed from the gas as solid CuS. From the balance calculation, the processed gas contained a total of $127.3 \cdot 10^{-6}$ moles of $H_2S$. This means that all copper ions from the solution could have been depleted and precipitated as CuS, but that was not the case. The test was too short to use all $Cu^{2+}$ ions from the solution, due to possible mass transfer limitations.

The balance calculation shows that in this case 0.615 was the $Cu^{2+}$ ion molar ratio to the $H_2S$ in the totally processed feed.

The actually captured $H_2S$ is visible in FIG. 3 as the area over the curve. Integration of the captured and non-captured areas using trapezoidal approximation between points gives result that 33.0% of $H_2S$ fed through the $CuSO_4$ solution have been captured.

Example 4

The same equipment that was used previously in Example 3 was also used in this test. As pointed out, in Examples 3 and 4, the feed gas was provided by a special one gallon (3.8 litres) sample bomb filled into 20 bars in the process and connected to the feed gas line in the laboratory. The sample bomb was filled again in process after the test of Example 3.

The test was carried out using the following materials:
Gas: Gas from a hydrogen stream of a natural fat hydrodeoxygenation process analysis given in Table 3. The gas was taken into special 1 gallon sample bomb.
Gas sample bomb outlet pressure regulated to 5 bar (abs.)
Gas flow adjusted with mass flow meter: 10 litres/hour
$CuSO_4$ solution: 0.05 mass-% $CuSO_4$ in ion exchanged water, pH 5, 250 ml Dräger-tubes: range 5-60 vol.-ppm $H_2S$ (1 litre of gas used in analysis)

The results of the copper sulphate washing are given in Table 5. $H_2S$ vol-ppm values were determined from the outlet gas of the $CuSO_4$ absorption bottle.

The solution pH after the test was 3. This indicates that sulphuric acid has been formed into the solution.

During the test the feed bomb ran out of gas and thus the end of this test is not reliable.

TABLE 5

Results of copper sulphate washing with industrial gas stream

| Time | Ritter, liters | Dräger in use | Gas flow through Dräger-tube, liter | Dräger-tube indication, vol-ppm | $H_2S$-content in gas, vol-ppm | Notes |
|---|---|---|---|---|---|---|
| 9:57 | Gas flow on | | | | | |
| 10:00 | 355483.60 | | | | | |
| 10:03 | 355484.10 | Start | | | | |
| 10:06 | 355484.60 | Stop | 0.50 | 1 | 2 | Solution a little brownish |
| 10:12 | 355486.10 | Start | | | | |
| 10:15 | 355486.60 | Stop | 0.50 | 5 | 10 | Visible precipitate |
| 10:23 | 355488.40 | Start | | | | |
| 10:26 | 355488.90 | Stop | 0.50 | 6 | 12 | More precipitate |
| 10:36 | 355491.10 | Start | | | | |
| 10:39 | 355491.60 | Stop | 0.50 | 11 | 22 | A lot of precipitate |
| 10:52 | 355494.60 | Start | | | | |
| 10:55 | 355495.10 | Stop | 0.50 | 13 | 26 | |
| 11:22 | 355500.80 | Start | | | | |
| 11:25 | 355495.30 | Stop | 0.50 | 19 | 38 | |
| 12:08 | 355510.50 | Start | | | | |
| 12:11 | 355511.00 | Stop | 0.50 | 30 | 60 | |
| 12:48 | 355518.90 | Start | | | | |
| 12:51 | 355519.40 | Stop | 0.50 | 40 | 80 | |
| 13:07 | 355522.90 | Start | | | | |
| 13:09 | 355523.40 | Stop | 0.50 | 48 | 96 | |
| 14:06 | 355535.50 | Start | | | | |
| 14:08 | 355535.70 | Stop | 0.20 | 60 | 300 | |
| 15:08 | 355548.40 | Start | | | | |
| 15:09 | 355548.55 | Stop | 0.15 | 55 | 367 | |
| 15:32 | 355553.60 | Start | | | | |
| 15:33 | 355553.75 | Stop | 0.15 | 62 | 413 | |
| 15:55 | 355558.65 | Start | | | | |
| 15:56 | 355558.80 | Stop | 0.15 | 61 | 407 | |
| 16:07 | 355560.95 | Start | | | | |
| 16:09 | 355561.05 | Stop | 0.10 | 38 | 380 | Feed bomb practically empty |
| 16:10 | 355561.09 | Gas flow off | | | | Feed bomb empty |

Figure 4:
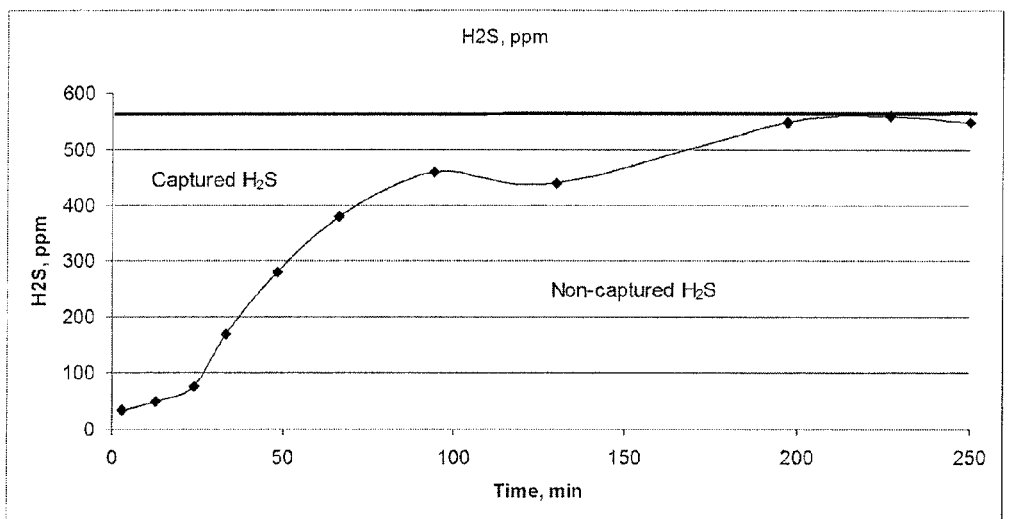
FIG. 4 is a graphical depiction of the results of Example 4, showing the proportion of captured $H_2S$ in vol-ppm as a function of time, in accordance with an exemplary aspect.

The same results are shown graphically in FIG. 4.

As the feed bomb became almost empty the results are treated only to time 15:33. The rest of data is rejected.

From the balances it can be calculated that 250 ml of 0.050 mass-% $CuSO_4$ solution contains $0.783 \cdot 10^{-3}$ moles of Cu. This is the maximum amount of moles of $H_2S$ that can be removed from the gas as solid CuS. From the gas flow balance calculation, the processed gas contained a total of $0.624 \cdot 10^{-3}$ moles of $H_2S$. The balance calculation shows that in this case 1.26 was the $Cu^{2+}$ ion molar ratio to the $H_2S$ in the totally processed feed.

The actually captured $H_2S$ is visible in FIG. 4 as the area over the curve. Integration of the captured and non-captured areas using trapezoidal approximation between points gives result that 76.4% of $H_2S$ fed through the $CuSO_4$ solution have been captured.

The first two examples used a mixture of 100 vol-ppm $H_2S$ in $CO_2$. The last two examples used a process gas from a hydrogen stream of a natural fat hydrodeoxygenation process. This gas contained about 560 vol-ppm $H_2S$ in a mixture of hydrogen (93.3 vol-%), carbon monoxide, carbon dioxide, methane, ethane, propane and some butanes. Both gases were subjected at nearly atmospheric pressure to bubble through dilute $CuSO_4$ solutions. The hydrogen sulphide dissolved in the water phase and then after ionization to sulphide ions combined with $Cu^{2+}$ ions to form practically insoluble CuS that precipitated out of the solution. The CuS precipitation happens nearly identically with both feed gases. As an additional result of the CuS precipitation sulphuric acid water solution is formed and the solution became more acidic during the tests, for example, when the $CuSO_4$ concentration was 0.1 mass-% and 0.05 mass-%.

The tests clearly show that even in very dilute concentrations of $Cu^{2+}$ ions, the hydrogen sulphide can be removed from the gas by bringing the gas into contact with $Cu^{2+}$ ion containing water solution. Other gases, which have been present in these tests, do not interfere.

All tests were performed in semi batch mode so that the $CuSO_4$ solution was first prepared and then the gases were bubbled through it while the bottle was mixed. This has proved the process concept to be a working solution.

In practice, for example, the hydrogen sulphide wash can be designed to operate in a continuous counter current multistage contacting device, like an absorption column. In an exemplary embodiment, the gas entering the equipment will first contact a solution that has little $Cu^{2+}$ ions left and some formed CuS solid. The last contact point of the gas (only little hydrogen sulphide left) in the equipment will then be with solution that contains highest $Cu^{2+}$ ion concentration and no CuS. The equipment can be designed so that the absorption solution is recycled. Because the solution becomes acidic it will dissolve with the sulphuric acid the CuO which has been added in the solution, giving fresh $Cu^{2+}$ ions. By proper design of the equipment it is clear based on these tests that the gas can be cleaned free of hydrogen sulphide down to ppm or sub-ppm level.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of purifying a gas formed from a process wherein a glyceride containing raw material is converted to hydrocarbon paraffins, said gas containing a minimum of about 75 vol-% of hydrogen and/or carbon dioxide and at least one sulphide compound as an impurity, the method comprising:
   contacting the gas with an acidic aqueous wash solution of at least one transition metal ion;
   binding at least a portion of the at least one sulphide compound contained in the gas into a substantially insoluble transition metal sulphide compound; and
   separating the formed metal sulphide compound together with the wash solution from the gas to obtain a purified gas.

2. The method according to claim 1, wherein the gas contains at least 0.1 vol-ppm of the at least one sulphide compound.

3. The method according to claim 1, wherein the at least one sulphide compound is selected from the group consisting of hydrogen sulphide, carbonyl sulphide, an organic sulphide and a combination thereof.

4. The method according to claim 1, wherein the gas is a hydrogen-rich gas derived from a process in which the glyceride raw material is contacted with hydrogen and which contains at least 80 vol-% and up to about 99 vol-% hydrogen.

5. The method according to claim 1, wherein the gas is a carbon dioxide-rich gas which contains at least 80 vol-% and up to about 99 vol-% carbon dioxide.

6. The method according to claim 1, wherein the gas is obtained from:
hydrogenation of fatty acids, esters of fatty acids or glycerides of fatty acids;
hydrodeoxygenation of fatty acids, esters of fatty acids or glycerides of fatty acids;
hydrocracking of fatty acids, esters of fatty acids or glycerides of fatty acids; or
a treatment comprising a combination or two or more of the hydrogenation, hydrodeoxygenation and hydrocracking; or
a decarb reaction selected from the group consisting of a decarboxylation reaction, a decarbonylation reaction and a combination thereof, wherein one-less-carbon n-paraffins are produced from the analogous fatty acids or carboxylic acid parts of glycerides along with carbon oxides, wherein a gas rich in carbon oxides is produced.

7. The method according to claim 1, wherein the gas contains hydrogen, along with hydrogen sulphide and one or more of carbon monoxide, carbon dioxide, methane, ethane, propane and butane.

8. The method according to claim 1, wherein the metal sulphide produced is precipitated in the aqueous solution and optionally recovered.

9. The method according to claim 1, wherein the at least one metal ion of the wash solution includes a transition metal selected from the group consisting of copper, zinc, iron and cobalt and a combination thereof.

10. The method according to claim 1, wherein the aqueous wash solution has a pH of about 1 to about 6.5.

11. The method according to claim 1, wherein the aqueous solution is prepared by dissolving about 1 to 10,000 parts by weight of a metal salt into 1,000,000 part by weight of water.

12. The method according to claim 1, wherein a concentration of the at least one transition metal ion is 0.00001 M to 0.1 M with respect to the aqueous wash solution.

13. The method according to claim 1, wherein a molar ratio of the at least one metal ion to the at least one sulphide compound of the gas to be purified is in excess of about 1.

14. The method according to claim 1, wherein the step of contacting the gas with the wash solution comprises spraying droplets of the wash solution into the gas, maintained in gaseous phase, and precipitating the absorbed sulphur compound in the form of solid metal sulphide in the droplets of the wash solution.

15. The method according to claim 14, wherein the wash solution is contacted with the gas in a spray chamber having a substantially vertical central axis, said gas being fed into the spray chamber so as to advance in a direction of the central axis of the spray chamber, and the wash solution being fed through spray nozzles arranged to provide at least one spray zone.

16. The method according to claim 15, wherein the gas is fed into the spray chamber via gas distributors arranged below the lowest spray zone, and the metal sulphide is withdrawn from the reactor along with the used wash liquid via an outlet arranged at a bottom part of the spray chamber.

17. The method according to claim 1, wherein the wash solution contains less than 1500 wt-ppm as metal of a metal salt.

18. The method according to claim 1, wherein the at least one sulphide compound includes hydrogen sulphide, and wherein at least 95% of the hydrogen sulphide is removed from the gas.

19. The method according to claim 1, wherein the concentration of hydrogen sulphide of the purified gas is less than about 500 ppb by volume.

20. The method according to claim 1, wherein the gas is contacted with the wash solution at a temperature in a range of 10 and 80° C. and at a pressure in a range of from 1 to 50 bar.

21. The method according to claim 1, wherein the step of contacting the gas with the wash solution is preceded by at least one step of purifying the gas.

22. The method according to claim 1, wherein $H_2S$ removal from the gas is carried out by washing effected in a multi-stage process.

23. The method according to claim 1, wherein in a first stage, the inlet gas is contacted with a washing liquid which contains less than a stoichiometric amount of the at least one metal ion with respect to the at least one sulphide compound present, and in a second stage of the process, the gas treated is contacted with a washing liquid which contains an excess of the at least one metal ion with respect to the at least one sulphide compound present in the gas.

24. The method according of claim 22, wherein the washing is carried out such that the gas to be purified first contacts a solution that has a first concentration of the at least one metal ion, whereas at a last contact point between the gas and the washing solution the washing solution has a second concentration of the at least one metal ion, said second concentration being at least 2 times greater than the first concentration.

25. The method according to claim 4, wherein the hydrogen-rich gas is an off-gas of the process.

26. The method according to claim 25, wherein the recovered purified gas is fed to amine washing.

27. The method according to claim 5, wherein the carbon dioxide-rich gas is a gas recovered from amine washing.

28. The method according to claim 1, wherein the gas is a hydrogen rich off-gas that is obtained from a process of producing diesel grade hydrocarbons comprising a hydrotreatment of a triglyceride raw material and at least one subsequent step selected from an isomerisation, a partial or total hydrocracking, or a combination thereof.

29. The method according to claim 1, wherein the gas is a purified hydrogen-rich off-gas optionally combined with a fresh feed, wherein the purified hydrogen-rich off-gas is formed from a hydrotreatment of a triglyceride raw material, where the hydrotreatment comprises a hydrotreating step and an isomerisation step, wherein the triglyceride raw material includes a biological oil, a natural fat, a product formed from a biological oil, a product formed from a natural fat, a free fatty acid, stearin or a combination thereof.

30. The method according to claim 1, wherein the glyceride containing raw material is formed from a biological oil, a natural fat, a product produced from a biological oil or a natural fat, and a combination thereof.

31. The method according to claim 1, wherein the gas contains about 3 to 5000 vol-ppm of the at least one sulphide compound.

32. The method according to claim 1, wherein the at least one metal ion of the wash solution comprises a bivalent metal ion of copper, zinc or iron or a combination thereof.

33. The method according to claim 1, wherein the aqueous wash solution has a pH of about 1.5 to about 5.5.

34. The method according to claim 1, wherein the aqueous solution is prepared by dissolving about 50 to 5,000 parts by weight of a metal salt into 1,000,000 part by weight of water.

35. The method according to claim 1, wherein a concentration of the at least one transition metal ion is about 0.00005 M to 0.005 M with respect to the aqueous wash solution.

36. The method according to claim 1, wherein a concentration of the at least one transition metal ion is about 0.0001 M to 0.001 M with respect to the aqueous wash solution.

37. The method according to claim 1, wherein a molar ratio of the at least one metal ion to the at least one sulphide compound of the gas to be purified is about 1.4 to about 6.

38. The method according to claim 1, wherein a molar ratio of the at least one metal ion to the at least one sulphide compound of the gas to be purified is about 2 to about 4.5.

39. The method according to claim 15, wherein the spray nozzles are arranged to provide multiple spray zones in series along the central axis at different heights in the spray chamber.

40. The method according to claim 1, wherein the wash solution contains less than 1000 wt-ppm as metal of a copper salt.

41. The method according to claim 1, wherein the wash solution contains about 10 to about 450 wt-ppm as metal of copper sulfate.

42. The method according to claim 1, wherein the at least one sulphide compound includes hydrogen sulphide, and wherein at least 99.5% of the hydrogen sulphide is removed from the gas.

43. The method according to claim 1, wherein the concentration of hydrogen sulphide of the purified gas is less than about 100 ppb by volume.

44. The method according to claim 22, wherein $H_2S$ removal from the gas is carried out by counter-current washing.

45. The method according of claim 22, wherein the washing is carried out such that the gas to be purified first contacts a solution that has a first concentration of the at least one metal ion, whereas at a last contact point between the gas and the washing solution the washing solution has a second concentration of the at least one metal ion, said second concentration being at least 10 times greater than the first concentration.

46. The method according to claim 1, wherein the glyceride containing raw material is selected from the group consisting of a plant oil, plant fat, animal fat, animal oil, fish oil, algae oil, yeast oil, mold oil, free fatty acid, stearin, and a combination thereof.

47. The method according to claim 1, wherein the gas comprises a mixture of hydrogen and carbon dioxide.

* * * * *